United States Patent [19]

Mark

[11] 4,113,695
[45] Sep. 12, 1978

[54] NON-OPAQUE FLAME-RETARDANT POLYCARBONATE COMPOSITION

[75] Inventor: Victor Mark, Evansville, Ind.

[73] Assignee: General Electric Company, Pittsfield, Mass.

[21] Appl. No.: 733,015

[22] Filed: Oct. 15, 1976

[51] Int. Cl.² ............................................. C08K 5/34
[52] U.S. Cl. ........................... 260/45.8 N; 260/45.7 S; 260/45.7 R; 260/45.8 RW; 260/45.8 A; 260/45.8 NZ; 260/45.8 SN
[58] Field of Search ...................... 260/45.7 S, 45.7 R, 260/45.8 RW, 45.8 A, 45.8 N, 45.8 SN, 45.8 NZ

[56] References Cited

U.S. PATENT DOCUMENTS

| | | | |
|---|---|---|---|
| 3,535,300 | 10/1970 | Gable | 260/45.85 N |
| 3,728,303 | 4/1973 | Kometani et al. | 260/45.7 R |
| 3,926,908 | 12/1975 | Mark | 260/45.7 S |
| 3,953,396 | 4/1976 | Mark | 260/45.95 G |

OTHER PUBLICATIONS

Kirk–Othmer, Encyclopedia of Chem. Techn. (2nd ed) (vol. 17) (1968) (Interscience) (N.Y.), pp. 213–215.
Encyclopedia of Polymer Science of Techn. (vol. 9) (1968) (Interscience) (N.Y.) pp. 525–527 & 530.

*Primary Examiner*—V. P. Hoke
*Attorney, Agent, or Firm*—Salvatore C. Mitri; William F. Mufatti

[57] ABSTRACT

An improved non-opaque flame-retardant polycarbonate composition of an aromatic carbonate polymer in admixture with an organic alkali metal salt or an organic alkaline earth metal salt or mixtures thereof, which composition has in admixture therewith an inorganic halide.

14 Claims, No Drawings

4,113,695

NON-OPAQUE FLAME-RETARDANT POLYCARBONATE COMPOSITION

This invention is directed to an improved non-opaque flame-retardant polycarbonate composition of an aromatic carbonate polymer in admixture with an organic alkali metal salt or an organic alkaline earth metal salt or mixtures thereof, the improvement which comprises having in admixture with said polycarbonate an inorganic halide.

BACKGROUND OF THE INVENTION

With the increasing concern for safety, there is a positive move toward providing safe materials for public and household use. One particular area of need is that of providing flame-resistant or flame-retardant non-opaque products for use by the ultimate consumer. As a result of this demand, many products are being required to meet certain flame-retardant criteria both by local and federal government and the manufacturers of such products. One particular set of conditions employed as a measuring standard for flame retardancy is set forth in Underwriters' Laboratories, Inc. Bulletin 94. This bulletin sets forth certain conditions by which materials are rated for self-extinguishing characteristics.

In the art, there are many known flame-retardant additives which are employed by mixing with products to render such materials self-extinguishing or flame retardant. Such flame-retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame-retardant additives with base product polycarbonate resins. Many of these known additives have a degrading effect upon the polymer.

In many instances, it is desirable that articles produced from these fire retardant polycarbonate resins retain their non-opaque characteristics.

DESCRIPTION OF THE INVENTION

It has been surprisingly discovered that the flame retardancy of an aromatic polycarbonate composition containing 0.001 to about 2.0 parts, per hundred parts of aromatic polycarbonate, of certain additives which are selected from organic alkali metal salts or organic alkaline earth metal salts or mixtures thereof can be greatly improved by the co-addition of from 0.001 to about 2.0 parts, per hundred parts of aromatic polycarbonate, of inorganic halides which are selected from alkali metal and alkaline earth metal halides while retaining the non-opaque characteristics of the aromatic polycarbonate.

The combination of the organic and inorganic salts not only results in improved flame retardancy but also allows the use of even lower concentrations of each of the salts than is possible in the individual formulations. The fact that the effect of the combined salts on flame retardancy is larger than the sum of the two separate salts suggests a synergistic interaction. The beneficial effect of the combination of salts manifests itself not only in flame retardancy but also in the optical and physical properties of the resulting polycarbonate as well. As a consequence of using lower amounts of the salts, a higher percentage of incident light is transmitted and the formulations have lower haze values yielding crystal clear polycarbonate. This is especially important when the polycarbonate is to be formed into a sheet for use in windows, for example. Thus, a sheet produced from the instant composition has clarity, light transmission and low haze. Additionally, the low salt concentrations preserve the high impact strength of polycarbonates.

Additionally, it has been found that the addition of the salts in the form of a solution results in a fire-retardant polycarbonate composition with better optical properties than when the salts are added in a finely divided solid form.

The non-opaque shaped article of the present invention is that comprising an aromatic carbonate polymer and from 0.001 to about 2.0 parts per hundred parts of aromatic carbonate polymer of an additive selected from the group consisting of organic alkali metal salts or organic alkaline earth metal salts or mixtures thereof and 0.001 to about 2.0 parts per hundred parts of aromatic carbonate of an inorganic halide selected from the group consisting of alkali metal halides and alkaline earth metal halides and mixtures thereof, wherein the shaped article has a refractive index in the range of 1.54 to 1.65. Particularly preferred shaped articles are in the form of a sheet and a pellet.

The refractive indicies of the materials herein are determined by the immersion method as described in *Physical Methods of Organic Chemistry*, by Arnold Weissberger, Interscience Publishers, Volume II, 1960 (page 1433).

When the refractive index of the instant additives is in the range of the refractive index of the aromatic carbonate polymer, i.e., 1.54 to 1.65, the polycarbonate composition and shaped article produced therefrom is non-opaque. This means that it is able to transmit light and is from translucent to transparent. Depending upon how close the refractive index of the additive is to that of the polycarbonate, this will determine whether the resulting composition is transparent or translucent. If the additive at the concentration employed is partially or totally soluble in the polycarbonate polymer, the more transparent the composition and resulting article will be.

The organic alkali metal salts and alkaline earth metal salts are selected from the group consisting of:
monomeric and polymeric alkali metal and alkaline earth metal aromatic sulfone sulfonates;
alkali metal and alkaline earth metal monomeric aromatic sulfonates and polymeric aromatic sulfonates;
alkali metal and alkaline earth metal monomeric aromatic substituted sulfonic acid salts and polymeric substituted aromatic sulfonic acids where the substituent is selected from the group consisting of an electron withdrawing radical and mixtures thereof;
alkali metal and alkaline earth metal salts of monomeric or polymeric phenol ester sulfonic acids;
alkali metal and alkaline earth metal salts of heterocyclic sulfonic acids;
alkali metal and alkaline earth metal salts of sulfonic acids of aromatic sulfides;
alkali metal and alkaline earth metal salts of sulfonic acids of aromatic ketones;
alkali metal and alkaline earth metal salts of substituted and unsubstituted sulfonic acids of monomeric and polymeric aromatic ethers wherein the substituents on the substituted sulfonic acids of aromatic ethers is selected from the group consisting of alkyl, aryl, alkoxy and aryloxy of 1 to 12 carbon atoms and electron withdrawing radical; and mixtures of these salts.

These organic alkali metal and alkaline earth metal salts are fully described in the following applications:

Application (A) of Victor Mark, Ser. No. 626,939, filed Oct. 29, 1975 and assigned to the same assignee as the instant invention, titled A NON-OPAQUE FLAME-RETARDANT POLYCARBONATE COMPOSITION. This application discloses a non-opaque flame-retardant polycarbonate composition comprising in admixture an aromatic carbonate polymer and an additive which may be the metal salts of either monomeric or polymeric aromatic sulfonesulfonic acids, or mixtures thereof.

Application (B) of Victor Mark, Ser. No. 626,937, filed Oct. 29, 1975 and assigned to the same assignee as the instant invention, titled A NON-OPAQUE FLAME-RETARDANT POLYCARBONATE COMPOSITION. This application discloses a non-opaque flame-retardant polycarbonate composition comprising in admixture, an aromatic carbonate polymer and an additive which may be the metal salts of either monomeric or polymeric aromatic sulfonic acids, or mixtures thereof.

Application (C) of Victor Mark, Ser. No. 626,936, filed Oct. 29, 1975 and assigned to the same assignee as the instant invention, titled A NON-OPAQUE FLAME-RETARDANT POLYCARBONATE COMPOSITION. This application discloses a non-opaque flame-retardant polycarbonate composition comprising in admixture, an aromatic carbonate polymer and a flame retardant additive which may be the metal salts of either monomeric or polymeric substituted aromatic sulfonic acids, or mixtures thereof.

Application (D) of Victor Mark, Ser. No. 626,935, filed Oct. 29, 1975 and assigned to the same assignee as the instant invention, titled A NON-OPAQUE FLAME-RETARDANT POLYCARBONATE COMPOSITION. This application discloses a non-opaque flame-retardant polycarbonate composition comprising in admixture, an aromatic carbonate polymer and an additive which may be the metal salts of either monomeric or polymeric phenol ester sulfonic acids, or mixtures thereof.

Application (E) of Victor Mark, Ser. No. 626,934, filed Oct. 29, 1975, now U.S. Pat. No. 4,039,509 patented Aug. 2, 1977 and assigned to the same assignee as the instant invention, titled A NON-OPAQUE FLAME-RETARDANT POLYCARBONATE COMPOSITION. This application discloses a non-opaque flame-retardant polycarbonate composition conprising in admixture, an aromatic carbonate polymer and an additive which may be the metal salts of heterocyclic sulfonic acids.

Application (F) of Victor Mark, Ser. No. 626,933, filed Oct. 29, 1975 and assigned to the same assignee as the instant invention, titled A NON-OPAQUE FLAME-RETARDANT POLYCARBONATE COMPOSITION. This application discloses a non-opaque flame-retardant polycarbonate composition comprising in admixture, an aromatic carbonate polymer and an additive which may be the metal salts of sulfonic acids or sulfonic acids of aromatic sulfides.

Application (G) of Victor Mark, Ser. No. 733,002, filed on the same date as this application and assigned to the same assignee as the instant invention, titled a NON-OPAQUE FLAME-RETARDANT POLYCARBONATE COMPOSITION. This application discloses a non-opaque flame-retardant polycarbonate composition comprising in admixture, an aromatic carbonate polymer and an additive which may be the metal salts of sulfonic acids of aromatic ketones.

Application (H) of Victor Mark, Ser. No. 733,014, filed on the same date as this application and assigned to the same assignee as the instant invention, titled A NON-OPAQUE FLAME-RETARDANT POLYCARBONATE COMPOSITION. This application discloses a non-opaque flame-retardant polycarbonate composition comprising in admixture, an aromatic carbonate polymer and an additive which may be the metal salts of either monomeric or polymeric aromatic ether sulfonic acids, and mixtures of all of these salts.

Application (A) through (H) are incorporated herein by reference. The metal salts of any of these applications as well as mixtures of any of the metal salts of any of the applications may be used herein.

As stated in the above-identified applications, and as employed herein in the salts substituted by electron withdrawing radicals, the electron withdrawing radicals are the halo-, nitro-, trihalomethyl- and cyano-electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

Preferred salts include sodium diphenylsulfide-4-sulfonate; potassium diphenylsulfoxide-4-sulfonate; potassium diphenylsulfone-3-sulfonate; sodium diphenylsulfone-3-sulfonate; dipotassium diphenylsulfide-4,4'-disulfonate; dipotassium diphenylsulfone-4,4'-disulfonate; sodium 2,5-dichlorobenzenesulfonate; dipotassium diphenylsulfone-3,3'-disulfonate; polysodium polystyrenepolysulfonate; polypotassium poly(chlorostyrene) polysulfonate.

The inorganic halides are selected from the group consisting of alkali metal halides and alkaline earth metal halides and mixtures thereof. The preferred inorganic halides include sodium chloride; potassium iodide, potassium bromide; sodium bromide; and potassium chloride.

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl) propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethyl-ammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, emllitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The composition of this invention is prepared by admixing the aromatic carbonate polymer with the organic and inorganic salts. The organic and inorganic salts may be admixed with the polycarbonate in a finely divided solid form or they may be admixed in the form of a solution. Preferably, the organic and inorganic salts are dissolved in a solvent in which they are soluble such as methanol and water, for example. Most preferably, the salts are admixed with the polycarbonate in the form of an aqueous solution.

The compositions of the instant invention may contain fillers, pigments, dyes, antioxidants, stabilizers, ultraviolet light absorbers, mold release agents and other additives commonly employed in non-opaque polycarbonate resin formulations. Furthermore, the shaped articles may be coated with, for example, mar- or scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred (100) parts of an aromatic polycarbonate, prepared by reacting 2,2-bis(4-hydroxyphenyl) propane and phosgene in the presence of an acid acceptor and a molecular weight regulator and having an intrinsic viscosity of 0.57 is mixed with the amounts of finely ground additives either singly or in combination as listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by about 1/16-⅛ in. thick into test squares of about 2 in. by 2 in. by about 1/i in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-0, then the rating for all 5 bars is V-II.

The test squares are tested for light transmission in a Gardner XL 10-CDM instrument. The data shows the amount of incident light transmitted by the test squares using air as 100% transmission.

The results of the different additives within the scope of the instant invention are as follows with a control being the aromatic polycarbonate as prepared above without the additives of the type set forth herein.

TABLE 1

| SAMPLE | Organic Salt Additive | Amount (parts per hundred) | Inorganic Salt Additive | Amount (parts per hundred) | Light Transmission % | Flame Out Time Seconds | No. of Drips per five test bars | UL-94 Rating |
|---|---|---|---|---|---|---|---|---|
| CONTROL | — | — | — | — | 86.2 | 26 | 13 | Burning |
| A | Sodium diphenyl-sulfide-4-sulfonate | 0.2 | — | — | 56.4 | 8.6 | 4 | V-II |
| B | — | — | sodium chloride | 0.2 | 70.8 | 7.2 | 5 | V-II |
| C | Sodium diphenyl-sulfide-4-sulfonate | 0.1 | sodium chloride | 0.1 | 74.6 | 5.5 | 0 | V-I |
| D | Potassium diphenyl-sulfoxide-4-sulfonate | 0.2 | — | — | 60.2 | 7.7 | 3 | V-II |
| E | — | — | potassium iodide | 0.5 | 65.2 | 5.0 | 4 | V-II |
| F | Potassium diphenyl-sulfoxide-4-sulfonate | 0.1 | potassium iodide | 0.1 | 80.2 | 4.8 | 0 | V-O |
| G | Potassium diphenyl-sulfone-3-sulfonate | 0.2 | — | — | 76.4 | 5.3 | 3 | V-II |
| H | — | — | potassium bromide | 0.2 | 68.2 | 5.9 | 6 | V-II |
| I | Potassium diphenyl-sulfone-3-sulfonate | 0.1 | potassium bromide | 0.2 | 82.2 | 2.8 | 0 | V-O |
| J | Potassium diphenyl-sulfone-3-sulfonate | 0.1 | sodium chloride | 0.3 | 79.8 | 5.3 | 0 | V-I |
| K | Sodium diphenyl-sulfone-3-sulfonate | 0.4 | — | — | 77.7 | 4.8 | 4 | V-II |
| L | — | — | sodium bromide | 0.2 | 60.4 | 5.4 | 1 | V-II |
| M | Sodium diphenyl-sulfone-3-sulfonate | 0.1 | sodium bromide | 0.1 | 84.6 | 4.8 | 0 | V-O |
| N | Dipotassium diphenyl-sulfide-4,4'-disulfonate | 0.1 | — | — | 84.8 | 6.7 | 4 | V-II |
| O | — | — | potassium chloride | 0.8 | 60.2 | 4.4 | 12 | V-II |
| P | Dipotassium diphenyl-sulfide-4,4'-disulfonate | 0.1 | potassium chloride | 0.2 | 78.2 | 5.2 | 0 | V-I |
| Q | Dipotassium diphenyl-sulfide-4,4'-disulfonate | 0.1 | potassium bromide | 0.1 | 84.2 | 4.8 | 0 | V-O |
| R | Dipotassium diphenyl-sulfone-4,4'-disulfonate | 0.5 | — | — | 78.3 | 8.0 | 3 | V-II |
| S | " | 0.2 | potassium bromide | 0.2 | 86.4 | 3.3 | 0 | V-O |
| T | " | 0.05 | " | 0.1 | 86.3 | 4.4 | 0 | V-O |
| U | Sodium 2,5-dichlorobenzenesulfonate | 0.5 | — | — | 76.8 | 5.9 | 3 | V-II |
| V | — | — | potassium bromide | 0.1 | 70.3 | 7.2 | 5 | V-II |
| W | Sodium 2,5-dichlorobenzenesulfonate | 0.1 | " | 0.1 | 80.2 | 4.3 | 0 | V-O |
| X | Dipotassium diphenyl-sulfone-3,3'-disulfonate | 0.2 | — | — | 83.2 | 5.0 | 4 | V-II |
| Y | " | 0.1 | potassium bromide | 0.1 | 85.3 | 4.0 | 0 | V-O |
| A' | Polysodium polystyrene polysulfonate | 0.5 | — | — | 84.2 | 7.6 | 6 | V-II |
| B' | " | 0.2 | potassium chloride | 0.2 | 85.3 | 4.4 | 0 | V-O |
| C' | Polypotassium poly(chlorostyrene) polysulfonate | 0.5 | — | — | 84.3 | 5.6 | 7 | V-II |
| D' | " | 0.1 | potassium bromide | 0.1 | 85.3 | 4.0 | 0 | V-O |

EXAMPLE II

This Example is set forth to demonstrate the effect of adding the additives of this invention in the form of a finely divided solid and in the form of a concentrated aqueous solution.

In preparing the test specimens for this Example, 100.00 parts of the polycarbonate of Example I is mixed with the amounts of the additive listed in TABLE 2 by blending the ingredients together. Test specimens are then molded using the same procedure employed in Example I. The test specimens are subjected to the test for light transmission as in Example I. Also, the test specimens are tested for haze in a Gardner Hazemeter. This measures that percent of the total transmitted light that is scattered forward from the normal by an angle larger than two degrees. The results are set forth in TABLE 2.

TABLE 2

| SAMPLE | Organic Salt Additive | Amount (parts per hundred) | Inorganic Salt Additive | Amount (parts per hundred) | Mode of Salt Addition | Light Transmission % | Haze % |
|---|---|---|---|---|---|---|---|
| CONTROL | — | — | — | — | — | 89.3 | 2.2 |
| A | Sodium diphenyl-sulfone-4-sulfonate | 0.2 | — | — | Solid | 85.8 | 7.6 |
| B | " | 0.2 | — | — | Solution | 87.2 | 4.1 |
| C | Sodium diphenyl-sulfone-3-sulfonate | 0.2 | — | — | Solid | 86.2 | 8.6 |
| D | " | 0.2 | — | — | Solution | 88.9 | 4.0 |
| E | Potassium diphenyl-sulfone-3-sulfonate | 0.2 | — | — | Solid | 88.1 | 5.6 |
| F | " | 0.2 | — | — | Solution | 89.0 | 2.3 |
| G | Dipotassium diphenyl-sulfone-3,3'-disulfonate | 0.2 | — | — | Solid | 88.9 | 4.4 |
| H | " | 0.2 | — | — | Solution | 89.2 | 2.2 |
| I | — | — | potassium bromide | 0.2 | Solid | 86.2 | 7.6 |
| J | — | — | potassium bromide | 0.2 | Solution | 88.3 | 2.6 |
| K | Potassium diphenyl-sulfone-3-sulfonate | 0.2 | potassium bromide | 0.2 | Solid | 82.6 | 6.0 |
| L | " | " | " | " | Solution | 88.6 | 2.6 |
| M | Dipotassium diphenyl-sulfone-3,3'-disulfonate | 0.2 | potassium bromide | 0.2 | Solid | 84.4 | 5.8 |
| N | " | " | " | " | Solution | 89.0 | 2.4 |

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. An improved non-opaque flame-retardant polycarbonate composition of an aromatic carbonate polymer in admixture with 0.001 to about 2.0 parts per hundred parts of the aromatic carbonate polymer of an additive selected from the group consisting of organic alkali metal salts of aromatic sulfonic acids, organic alkaline earth metal salts of aromatic sulfonic acids or mixtures thereof, the improvement which comprises having in admixture with the flame-retardant aromatic carbonate polymer 0.001 to about 2.0 parts per hundred parts of the aromatic carbonate polymer an inorganic halide selected from the group consisting of an alkali metal halide, an alkaline earth metal halide or mixtures thereof, the halogen substituent in said inorganic halide being bromine, chlorine or iodine and said aromatic carbonate polymer, said organic metal salts or mixtures thereof, and said inorganic halide each having a refractive index in the range of 1.54 to 1.65.

2. An improved non-opaque shaped article having a refractive index in the range of 1.54 to 1.65 of an aromatic carbonate polymer in admixture with 0.001 to about 2.0 parts per hundred parts of the aromatic carbonate polymer of an additive selected from the group consisting of organic alkali metal salts of aromatic sulfonic acids, organic alkaline earth metal salts of aromatic sulfonic acids or mixtures thereof, the improvement which comprises having in admixture with the aromatic carbonate polymer, 0.001 to about 2.0 parts per hundred parts of the aromatic carbonate polymer, an inorganic halide selected from the group consisting of an alkali metal halide, an alkaline earth metal halide or mixtures thereof, the halogen substituent in said organic halide being bromine, chlorine or iodine.

3. The shaped article of claim 2 wherein the metal salt is sodium diphenylsulfone-4-sulfonate.

4. The shaped article of claim 2 wherein the metal salt is potassium diphenylsulfone-3-sulfonate.

5. The shaped article of claim 2 wherein the metal salt is dipotassium diphenylsulfone-3,3'-disulfonate.

6. The shaped article of claim 2 wherein the metal salt is sodium 2,5-dichlorobenzenesulfonate.

7. The shaped article of claim 2 wherein the metal salt is polysodium polystyrene polysulfonate.

8. The shaped article of claim 2 wherein the metal salt is polypotassium poly(chlorostyrene) polysulfonate.

9. The shaped article of claim 2 wherein the alkali metal halide is selected from the group consisting of sodium chloride, sodium bromide, potassium chloride, potassium bromide and potassium iodide.

10. The shaped article of claim 2 in the form of a sheet.

11. The shaped article of claim 2 in the form of a pellet.

12. A method of preparing a non-opaque flame-retardant polycarbonate composition which comprises mixing said polycarbonate with a solution containing an organic alkali metal salt of aromatic sulfonic acids, alkaline earth metal salt of aromatic sulfonic acids or mixtures thereof, said polycarbonate and said organic metal salts or mixtures thereof each having a refractive index in the range of 1.54 to 1.65.

13. The method of claim 12 wherein the solution containing the organic alkali metal salt, alkaline earth metal salt or mixtures thereof contains an inorganic halide selected from the group consisting of an alkali metal halide, alkaline earth metal halide or mixtures thereof, the halogen substituent in said inorganic halide being bromine, chlorine or iodine.

14. The method of claim 12 wherein the solution containing the organic alkali metal salt or alkaline earth metal salt or mixtures thereof is an aqueous solution.

* * * * *